US012751477B2

(12) United States Patent
Khanzhin et al.

(10) Patent No.: US 12,751,477 B2
(45) Date of Patent: Oct. 6, 2026

(54) INFANT FORMULA WITH LOW LEVEL OF ARSENIC

(71) Applicant: DSM IP Assets B.V.

(72) Inventors: Nikolay Khanzhin, Kaiseraugst (CH); Pierre Chassagne, Kaiseraugst (CH)

(73) Assignee: DSM IP Assets B.V., Maastricht (NL)

( * ) Notice: Subject to any disclaimer, the term of this patent is extended or adjusted under 35 U.S.C. 154(b) by 256 days.

(21) Appl. No.: 18/557,902

(22) PCT Filed: Apr. 28, 2022

(86) PCT No.: PCT/EP2022/061325
§ 371 (c)(1),
(2) Date: Oct. 27, 2023

(87) PCT Pub. No.: WO2022/229316
PCT Pub. Date: Nov. 3, 2022

(65) Prior Publication Data

US 2024/0349770 A1 Oct. 24, 2024

(30) Foreign Application Priority Data

Apr. 30, 2021 (EP) .................................... 21171431

(51) Int. Cl.

| | |
|---|---|
| ***A23L 33/00*** | (2016.01) |
| ***A23L 33/12*** | (2016.01) |
| ***A23L 33/125*** | (2016.01) |
| ***A23L 33/155*** | (2016.01) |

(52) U.S. Cl.
CPC ............... *A23L 33/40* (2016.08); *A23L 33/12* (2016.08); *A23L 33/125* (2016.08); *A23L 33/155* (2016.08)

(58) Field of Classification Search
CPC .......... A23L 33/40; A23L 33/10; A23L 33/12; A23L 33/125; A23L 33/135; A23L 33/21; A23V 2200/3202; A23V 2002/00; A23V 2250/28; A23V 2250/284; A23V 2250/282; A23V 2250/1868
USPC ................ 426/80, 74, 658, 62, 588, 801, 72
See application file for complete search history.

(56) References Cited

U.S. PATENT DOCUMENTS

| | | | | |
|---|---|---|---|---|
| 10,499,668 | B2 | 12/2019 | Brassart et al. | |
| 10,639,319 | B2 * | 5/2020 | Davis | A61K 35/747 |
| 11,160,817 | B2 * | 11/2021 | Chow | A23C 9/206 |
| 11,547,744 | B2 * | 1/2023 | McGrath | A23L 33/12 |
| 2012/0121772 | A1 | 5/2012 | Bijl et al. | |
| 2016/0333042 | A1 | 11/2016 | Jennewein | |
| 2020/0205430 | A1 | 7/2020 | Owens | |

FOREIGN PATENT DOCUMENTS

| | | | |
|---|---|---|---|
| CN | 103501639 | 1/2014 | |
| EP | 3131912 | 2/2017 | |
| WO | WO 2016095924 | 6/2016 | |
| WO | WO 2018178271 | 10/2018 | |
| WO | WO-2019110801 A1 * | 6/2019 | C07H 3/06 |
| WO | WO 2020058251 | 3/2020 | |
| WO | WO 2021064629 | 4/2021 | |

OTHER PUBLICATIONS

Albermann et al., Synthesis of the milk oligosaccharide 2'-fucosyl-lactose using recombinant bacterial enzymes. Carbohydrate research, 334(2), 97-103 (2001).
Andreas et al., Human breast milk: A review on its composition and bioactivity. Early human development, 91(11), 629-635 (2015).
Chen, Adv. Carbohydr. Chem. Biochem. 72, 113 (2015).
Hughes et al., Evaluation and synthesis of health effects studies of communities surrounding arsenic producing industries. Int J Epidemiol., 17(2), 407-413 (1988).
Jaishankar et al., Toxicity, mechanism and health effects of some heavy metals. Interdisciplinary toxicology, 7(2), 60-72 (2014).
La Motte, "Leading baby food manufacturers knowingly sold products with high levels of toxic metals, a congressional investigation found", Feb. 5, 2021, available at https://edition.cnn.com/2021/02/04/health/baby-food-heavy-metal-toxins-wellness.
Sternowsky et al., Arsenic in breast milk during the first 3 months of lactation. International journal of hygiene and environmental health, 205(5), 405-409 (2002).
Urashima et al., Milk oligosaccharides, Nova Biomedical Books, 2011.

* cited by examiner

*Primary Examiner* — Hong T Yoo
(74) *Attorney, Agent, or Firm* — Neal, Gerber & Eisenberg LLP

(57) ABSTRACT

Infant formulae with a very low level of arsenic are obtained by selecting the components of the infant formula very carefully. For manufacturing infant formulae that comprise less than 95 parts per billion (ppb) of arsenic, it is preferred to use human milk oligosaccharides (HMOs) that have been isolated from a fermentation broth without using activated carbon in the last purification step. The preferred HMO is 2'-O-fucosyllactose.

20 Claims, No Drawings

INFANT FORMULA WITH LOW LEVEL OF ARSENIC

CROSS-REFERENCE TO RELATED APPLICATIONS

This application is a national stage entry pursuant to 35 U.S.C. § 371 of International Application No. PCT/EP2022/061325, filed on Jan. 29, 2021, which claims priority to European Application No. 21171431.6, filed Apr. 30, 2021, the entire contents of all of which are hereby incorporated by reference in their entirety.

TECHNICAL FIELD

The present invention relates to food for infants that is suitable as a complete or partial substitute for human milk.

BACKGROUND OF THE INVENTION

For some time it has been known that toxic metals like arsenic, lead, cadmium and mercury exist in baby foods at levels that exceed what experts and governing bodies say are permissible. "Arsenic, lead, cadmium and mercury are in the World Health Organization's top 10 chemicals of concern for infants and children", writes CNN journalist Sandee LaMotte. "As natural elements, they are in the soil in which crops are grown and thus can't be avoided. Some crop fields and regions, however, contain more toxic levels than others, partly due to the overuse of metal-containing pesticides and ongoing industrial pollution. [ . . . ] All of these heavy metals have been linked to cancer, chronic disease and neurotoxic effects, but it's the devastating damage that can be done to a developing baby's brain that makes baby food toxicity so critical. [ . . . ] From the time of conception through the age of 2, babies have an extremely high sensitivity to neurotoxic chemicals [ . . . ]" (Sandee LaMotte, "Leading baby food manufacturers knowingly sold products with high levels of toxic metals, a congressional investigation found", Feb. 5, 2021, available at https://edition.cnn.com/2021/02/04/health/baby-food-heavy-metal-toxins-wellness).

Arsenic is one of the most important heavy metals causing disquiet from both ecological and individual health standpoints (Hughes J P, Polissar L, Van Belle G. Evaluation and synthesis of health effects studies of communities surrounding arsenic producing industries. Int J Epidemiol. 1988; 17:407-413, as cited in Jaishankar, Monisha & Tseten, Tenzin & Anbalagan, Naresh & Mathew, Blessy & Beeregowda, Krishnamurthy. (2014). Toxicity, mechanism and health effects of some heavy metals. Interdisciplinary toxicology. 7. 60-72. 10.2478/intox-2014-0009).

There is a need for an infant formula with low level of arsenic.

SUMMARY OF THE INVENTION

The present invention relates to an infant formula comprising:

a) at least one human milk oligosaccharide in an amount of at least 0.5 weight-%, based on the total weight of the infant formula,
b) at least one source of at least one long-chain polyunsaturated fatty acid,
c) at least one source of carbohydrate,
d) optionally lutein, and
e) less than 5 weight-% water, based on the total weight of the infant formula, wherein docosahexaenoic acid and arachidonic acid are the preferred long-chain polyunsaturated fatty acids, and characterized in that the infant formula comprises less than 95 parts per billion of arsenic.

The present invention also relates to the use of human milk oligosaccharides (HMOs) that have been isolated from a fermentation broth without using activated carbon in the last purification step. Such HMOs are particularly suitable for manufacturing infant formulae that comprise less than 95 parts per billion of arsenic. The preferred HMO is 2'-O-fucosyllactose. Infant formulae with a particularly low level of arsenic are obtained by carefully selecting other components of the infant formula.

DETAILED DESCRIPTION OF THE INVENTION

The infant formula of the present invention is a powderous mixture. When getting a bottle ready for an infant, the parent adds cooled, boiled water to the infant formula, preferably in a sterilised bottle.

The present invention relates to a powderous mixture that comprises multiple components. Some or all of the mixture's components may contain toxic arsenic. The total amount of arsenic in the mixture is the sum thereof. The inventors have found that potentially dangerous levels of toxic arsenic can be avoided by carefully selecting and/or avoiding components of a typical infant formula.

Human milk comprises specific oligosaccharides, referred to as human milk oligosaccharides (HMOs). Thus, substitutes for human milk should also comprise one or more human milk oligosaccharides. In the context of the present invention, 2'-O-fucosyllactose (2'-FL) is the preferred human milk oligosaccharide (HMO).

Often, human milk oligosaccharides (HMOs) are produced by microbial fermentation. HMOs produced by microbial fermentation need to be purified. Processes for the purification of HMOs are known. Many known purification processes comprise a treatment with activated carbon. Whereas activated carbon has toxin-absorbing properties, it is surprisingly also a source of arsenic. Arsenic originating from activated carbon can be removed by a subsequent purification step (e.g. by crystallization). It is therefore acceptable to use activated carbon for purifying HMOs, provided activated carbon is not used in the last purification step.

FIG. 2 of EP 3 131 912 discloses a process for purification of HMO from microbial fermentation, wherein an activated carbon treatment step is followed by electrodialysis. Performing electrodialysis as the last purification step is possible, but not preferred. According to the invention, the last purification step is preferably crystallization.

In the context of the present invention, the terms "activated carbon" and "active charcoal" are used synonymously.

Human Milk Oligosaccharides (HMOs) of the Invention's Infant Formula

Human milk oligosaccharides (HMOs) are a family of structurally diverse unconjugated glycans that are highly abundant in and unique to human breast milk. HMOs are composed of the five monosaccharides glucose (Glc), galactose (Gal), N-acetylglucosamine (GlcNAc), fucose (Fuc) and sialic acid (Sia), with N-acetylneuraminic acid (Neu5Ac) as the predominant if not only form of Sia. More than two hundred different HMOs have been identified so far. The most important are 2'-O-fucosyllactose (2'-FL), lacto-N-neotetraose (LNnT), lacto-N-tetraose (LNT) and 3-O-fucosyllactose (3-FL). In 3-FL (i.e. without '), fucose is attached to the glucose moiety of lactose, whereas in 2'-FL, fucose is attached to the galactose moiety of lactose.

HMOs can be isolated from human breast milk or they can be produced chemically or biochemically. HMOs are commercially available from a variety of producers, including DSM® Nutritional Products, Switzerland.

The infant formula of the present invention comprises at least one HMO. Preferably, said at least one HMO has been isolated from a fermentation broth without using activated carbon in the last purification step. Such preferred HMO is comprised in the invention's infant formula in an amount of preferably at least 0.5 weight-%, more preferably at least 0.8 weight-%, even more preferably at least 1 weight-% and most preferably at least 1.5 weight-%, based on the total weight of the infant formula.

The human milk oligosaccharides referred to in the present invention are preferably synthetic, i.e. produced by chemical and/or preferably by biochemical processes in vitro. The synthetic HMOs used in the present invention may be selected from one or more of LNT, LNnT, 2'-FL, 3-FL, DFL, LNFP I, 3'-SL, 6'-SL, FSL, LST a, LST b, and DS-LNT, preferably LNT, LNnT, 2'-FL, 3-FL, DFL, LNFP I, 3'-SL and 6'-SL.

Synthetic HMOs may be neutral or acidic (sialylated).

The term "neutral human milk oligosaccharide" means a non-sialylated (therefore neutral) complex carbohydrate found in human breast milk (Urashima et al.: Milk oligosaccharides, Nova Biomedical Books, 2011; Chen Adv. Carbohydr. Chem. Biochem. 72, 113 (2015)) comprising a core structure being a lactose unit at the reducing end that is a) substituted with one or two α-L-fucopyranosyl moieties, b) substituted with a galactosyl residue, or c) elongated, via its 3'-OH group, by an N-acetylglucosamine, a lacto-N-biose (Galβ1-3GlcNAc) or an N-acetyllactosamine (Galβ1-4GlcNAc) moiety. The N-acetyllactosamine containing derivatives can be further substituted with N-acteyllactosamine and/or lacto-N-biose (lacto-N-biose is always a non-reducing terminal). The N-acetyllactosamine and the lacto-N-biose containing derivatives can optionally be substituted by one or more α-L-fucopyranosyl moieties.

Examples of neutral trisaccharide HMOs include 2'-O-fucosyllactose (2'-FL, Fucα1-2Galβ1-4Glc), 3-O-fucosyllactose (3-FL, Galβ1-4 (Fucα1-3)Glc) and lacto-N-triose II (GlcNAcβ1-3Galβ1-4Glc); examples of neutral tetrasaccharide HMOs include 2',3-di-O-fucosyllactose (DFL, Fucα1-2Galβ1-4 (Fucα1-3)Glc), lacto-N-tetraose (LNT, Galβ1-3GlcNAcβ1-3Galβ1-4Glc) and lacto-N-neotetraose (LNnT, Galβ1-4GlcNAcβ1-3Galβ1-4Glc); examples of neutral pentasaccharide HMOs include lacto-N-fucopentaose I (LNFP I, Fucα1-2Galβ1-3GlcNAcβ1-3Galβ1-4Glc), lacto-N-fucopentaose II (LNFP II, Galβ1-3(Fucα1-4) GlcNAcβ1-3Galβ1-4Glc), lacto-N-fucopentaose III (LNFP III, Galβ1-4(Fucα1-3) GlcNAcβ1-3Galβ1-4Glc), lacto-N-fucopentaose V (LNFP V, Galβ1-3GlcNAcβ1-3Galβ1-4 (Fucα1-3)Glc) and lacto-N-fucopentaose VI (LNFP VI, Galβ1-4GlcNAcβ1-3Galβ1-4(Fucα1-3)Glc); examples of neutral hexasaccharide HMOs include lacto-N-difucohexaose I (LNDFH I, Fucα1-2Galβ1-3 (Fucα1-4) GlcNAcβ1-3Galβ1-4Glc), lacto-N-difucohexaose II (LNDFH II, Galβ1-3 (Fucα1-4)GlcNAcβ1-3Galβ1-4 (Fucα1-3) Glc), lacto-N-difucohexaose III (LNDFH III, Galβ1-4 (Fucα1-3)GlcNAcβ1-3Galβ1-4 (Fucα1-3)Glc), lacto-N-hexaose (LNH, Galβ1-3GlcNAcβ1-3 (Galβ1-4GlcNAcβ1-6) Galβ1-4Glc), para-lacto-N-hexaose (pLNH, Galβ1-3GlcNAcβ1-3Galβ1-4GlcNAcβ1-3Galβ1-4Glc), lacto-N-neohexaose (LNnH, Galβ1-4GlcNAcβ1-3 (Galβ1-4GlcNAcβ1-6) Galβ1-4Glc) and para-lacto-N-neohexaose (pLNnH, Galβ1-4GlcNAcβ1-3Galβ1-4GlcNAcβ1-3Galβ1-4Glc).

The term "sialylated human milk oligosaccharide" means a sialylated complex carbohydrate found in human breast milk (Urashima et al.: Milk oligosaccharides, Nova Biomedical Books, 2011; Chen Adv. Carbohydr. Chem. Biochem. 72, 113 (2015)) comprising a core structure being a lactose unit at the reducing end that can be elongated by one or more β-N-acetyl-lactosaminyl and/or one or more β-lacto-N-biosyl units, and which core structure is substituted by an α-N-acetyl-neuraminyl (sialyl) moiety and optionally can be substituted by an α L-fucopyranosyl moiety. In this regard, the acidic HMOs have at least one sialyl residue in their structure.

Examples of acidic HMOs include 3'-sialyllactose (3'-SL), 6'-sialyllactose (6'-SL), 3-fucosyl-3'-sialyllactose (FSL), LST a, fucosyl-LST a (FLST a), LST b, fucosyl-LST b (FLST b), LST c, fucosyl-LST c (FLST c), sialyl-LNH (SLNH), sialyl-lacto-N-hexaose (SLNH), sialyl-lacto-N-neohexaose I (SLNH-I), sialyl-lacto-N-neohexaose II (SLNH-II) and disialyl-lacto-N-tetraose (DS-LNT).

The infant formula of the present invention preferably comprises 2'-O-fucosyllactose (2'-FL), lacto-N-neotetraose (LNnT), lacto-N-tetraose (LNT), 3'-sialyllactose (3'-SL), 6'-sialyllactose (6'-SL), 3-O-fucosyllactose (3-FL), 2',3-di-O-fucosyllactose (DFL), lacto-N-fucopentaose I (LNFP I) or any mixture thereof. More preferably, the infant formula of the present invention comprises 2'-O-fucosyllactose (2'-FL), lacto-N-neotetraose (LNnT), lacto-N-tetraose (LNT), 3-O-fucosyllactose (3-FL) 2',3-di-O-fucosyllactose (DFL), 3'-sialyllactose (3'-SL), 6'-sialyllactose (6'-SL) or any mixture thereof. Even more preferred, The infant formula of the present invention preferably comprises 2'-O-fucosyllactose (2'-FL), lacto-N-neotetraose (LNnT), lacto-N-tetraose (LNT), 3-O-fucosyllactose (3-FL), 2',3-di-O-fucosyllactose (DFL) or any mixture thereof. The most preferred HMO of the herein disclosed invention is 2'-O-fucosyllactose (2'-FL).

Preferred mixtures of HMOs are:

- mixture comprising 2'-FL and LNnT, wherein the weight ratio 2'-FL:LNnT is preferably from 3:1 to 1:1 and is more preferably 2:1,
- mixture comprising 2'-FL and DFL, and
- mixture comprising LNFP-I and 2'-FL.

The at least one HMO of the invention's infant formula has preferably been isolated from a fermentation broth, wherein the isolated HMO is purified and wherein the last purification step is preferably crystallization.

Embodiments, wherein the at least one human milk oligosaccharide has been isolated from a fermentation broth using activated carbon in the last purification step are not preferred because such HMOs are a potential source of arsenic.

Other Potential Sources of Arsenic

Some infant formulae comprise long-chain polyunsaturated fatty acids. Long-chain polyunsaturated fatty acids as herein referred to comprise preferably from 18 to 24 C-atoms. Long-chain polyunsaturated fatty acids as herein referred to are most preferably docosahexaenoic acid (DHA) and/or arachidonic acid (ARA). Sources of the preferred long-chain polyunsaturated fatty acids are—amongst others—krill oil and fish oil.

The inventors have found that potentially dangerous levels of toxic arsenic can be avoided by not adding Antarctic krill oil or fish oil to an infant formula. Whereas krill oil and fish oil comprise significant amounts of DHA and/or ARA, such oil is also a potential source of arsenic. This is to be avoided. The infant formula of the present invention preferably comprises at least one source of docosahexaenoic acid and/or arachidonic acid, wherein said at least one source of docosahexaenoic acid and/or arachidonic acid is preferably neither krill oil nor fish oil.

Introducing arsenic into an infant formula via krill or fish oil can be avoided by replacing it with algae oil and/or fungi oil. Commercially available algae oil and fungi oil comprises significant amounts of DHA and/or ARA, but virtually no arsenic. Thus, oil originating from algae or fungi is the preferred source of DHA and/or ARA when preparing an infant formula comprising less than 95 parts per billion of arsenic.

The preferred infant formula of the present invention is a powderous breastmilk substitute. Adding a liquid oil to a powder is often difficult and seldom beneficial. Powders comprising DHA and/or ARA are obtainable by microencapsulating algae oil or fungi oil. Processes for encapsulating oils are known to the person skilled in the art. By way of example, oils can be converted into powders by spray-drying emulsions that contain the respective oil. In a preferred embodiment, the infant formula of the present invention comprises spray-dried algae oil and/or spray-dried fungi oil, wherein said algae oil or fungi oil comprises DHA and/or ARA. A further approach for microencapsulating oils is coacervation. In one embodiment, the infant formula of the present invention comprises coacervates, wherein said coacervates comprise algae oil and/or fungi oil, and wherein said algae oil or fungi oil comprises DHA and/or ARA. DHA and ARA powders comprising or consisting of coacervates are commercially available at DSM® Nutritional Products, Switzerland.

Most infant formulae comprise at least one source of carbohydrate. An exemplary source of carbohydrate is maltodextrin. Maltodextrin is a starch derivative and may be derived inter alia from rice starch (herein referred to as "rice maltodextrin"), corn starch (herein referred to as "corn maltodextrin") or potato starch (herein referred to as "potato maltodextrin"). The inventors have found that potentially dangerous levels of toxic arsenic can be avoided by not using rice as source of carbohydrate. Rice readily absorbs arsenic from the environment, about 10 times more of it than other grains. Thus, rice is a potential source of arsenic. Preferably, the infant formula of the present invention is free of rice maltodextrin.

Introducing arsenic into an infant formula via rice maltodextrin can be avoided by replacing it with corn maltodextrin. A preferred embodiment of the invention relates to an infant formula comprising at least one source of carbohydrate, wherein said at least one source of carbohydrate is preferably maltodextrin, and wherein said maltodextrin is preferably corn maltodextrin.

The most preferred infant formula of the present invention is free of carbohydrate originating from rice. Thereby, "free of carbohydrate originating from rice" can mean that the infant formula comprises less than 0.5 weight-%, preferably less than 0.3 weight-%, more preferably less than 0.2 weight-%, and most preferably less than 0.1 weight-% carbohydrate originating from rice, based on the total weight of the infant formula.

Infant Formula of the Present Invention

The preferred infant formula is a powderous breastmilk substitute. If at all, powders comprise little water. The infant formula of the present invention comprises preferably less than 5 weight-% water, more preferably less than 4 weight-% water, even more preferably less than 3 weight-% and most preferably less than 2 weight-% water, based on the total weight of the infant formula.

The infant formula of the present invention comprises preferably less than 95 parts per billion of arsenic, more preferably less than 90 parts per billion of arsenic, even more preferably less 85 parts per billion of arsenic, and most preferably less 80 parts per billion of arsenic. Parts per billion (ppb) is a weight to weight ratio used to describe concentrations. In the context of the present invention, parts per billion (ppb) is used to indicate the concentration of arsenic in an infant formula: 1 ppb arsenic equals 1 μg arsenic per kg infant formula.

The infant formula of the present invention comprises at least one HMO as herein described. A preferred infant formula comprises 2'-O-fucosyllactose in an amount of preferably at least 0.5 weight-%, more preferably at least 0.8 weight-%, even more preferably at least 1 weight-%, and most preferably at least 1.2 weight-%, based on the total weight of the infant formula, and is characterized in that said 2'-O-fucosyllactose has been isolated from a fermentation broth without using activated carbon in the last purification step. The last purification step is preferably crystallization.

The preferred infant formula of the present invention comprises at least one source of carbohydrate as herein described. Said source is preferably not rice. A preferred infant formula of the present invention comprises at least one source of carbohydrate, wherein said at least one source of carbohydrate is preferably maltodextrin, and wherein said maltodextrin is preferably corn maltodextrin. In one embodiment, the infant formula of the present invention comprises preferably less than 5 weight-%, more preferably less than 3 weight-%, even more preferably less than 2 weight-%, and most preferably less than 1 weight-% carbohydrate originating from rice, based on the total weight of the infant formula.

The preferred infant formula of the present invention comprises at least one source of docosahexaenoic acid and/or arachidonic acid as herein described. Said source is preferably neither krill oil nor fish oil. A preferred infant formula of the present invention comprises at least one source of docosahexaenoic acid and/or arachidonic acid, wherein said at least one source of docosahexaenoic acid and/or arachidonic acid is preferably oil originating from algae or fungi. In one embodiment, the infant formula of the present invention comprises spray-dried algae oil or spray-dried fungi oil in an amount of preferably at least 0.5 weight-%, more preferably at least 1 weight-%, even more preferably at least 2 weight-%, and most preferably at least 3 weight-%, based on the total weight of the infant formula, wherein said algae or said fungi oil comprises docosahexaenoic acid and/or arachidonic acid.

The infant formula of the present invention may comprise further optional compounds. A preferred optional compound is lutein. Breast milk may contain lutein derived from the mother's diet. Other preferred optional compounds are vitamins. The most preferred vitamin is vitamin D, preferably vitamin D3.

Method of the Present Invention

The infant formula of the present invention is preferably obtained by the method of the present invention. Said method comprises the step of blending the herein described at least one HMO with the herein described at least one source of carbohydrate and the herein described source of long-chain polyunsaturated fatty acids (being preferably a source of docosahexaenoic acid and/or arachidonic acid). The herein described optional compounds (such as lutein and/or vitamins) may also be added (before, after or during the above mentioned blending).

One embodiment of the present invention relates to a method of manufacturing an infant formula that comprises less than 95 parts per billion of arsenic, said method comprising the step of:

providing a powderous mixture comprising at least one human milk oligosaccharide, at least one source of carbohydrate and at least one powderous source of long-chain polyunsaturated fatty acids, characterized in that said at least one human milk oligosaccharide has been isolated from a fermentation broth without using activated carbon in the last purification step, and/or characterized in that said at least one source of carbohydrate is not rice maltodextrin, and/or characterized in that said at least one powderous source of long-chain polyunsaturated fatty acid is neither krill oil nor fish oil, and/or wherein a powderous mixture comprises 2'-O-fucosyllactose, and/or wherein a powderous mixture comprises corn starch, and/or wherein said at least one powderous source of long-chain polyunsaturated fatty acid is microencapsulated algae oil, microencapsulated fungi oil or a mixture thereof.

Use of the Present Invention

The present invention also relates to the use of at least one HMO as herein described for providing an infant formula that comprises less than 95 parts per billion of arsenic. A preferred embodiment of the present invention relates to the use 2'-O-fucosyllactose for providing an infant formula that comprises less than 95 parts per billion of arsenic, characterized in that said 2'-O-fucosyllactose has been isolated from a fermentation broth without using activated carbon in the last purification step. The last purification step is preferably crystallization.

Baby Food of the Present Invention

The present invention also relates to baby food obtainable by adding water to the herein described infant formula. Thereby, the addition of cooled, boiled water is preferred. Provided the added water is not contaminated with arsenic, the thus obtained baby food comprises arsenic at a level that does not exceed what experts and governing bodies say is permissible.

EXAMPLES

Example 1

In example 1,2'-O-fucosyllactose was produced by fermentation and purified according to the process disclosed in WO 2021/064629 (ultrafiltration with 15 kDa ceramic membrane, nanofiltration/diafiltration on Trisep-UA60 1812 membrane, treatment with a strong cation exchanger with sulfonic acid groups, H+-form, followed by a weak basic resin, free-base form). The so-obtained eluate was passed through granulated active charcoal (CPG LF), then the obtained colorless solution was freeze-dried.

Analytics revealed the product comprised 0.18 mg/kg arsenic, more than acceptable. Root cause analysis revealed that the used charcoal comprised high concentrations of arsenic. Without wishing to be bound by theory, it was speculated that the soils in the charcoal's country of origin are contaminated with arsenic.

Example 2

In example 2,2'-O-fucosyllactose was produced similar to example 1. In the purification process of example 2, freeze-drying was replaced by crystallization (as disclosed in e.g. WO 2016/095924).

Analytics revealed that the crystalline product comprised 0.003 mg/kg arsenic. Arsenic can be removed from contaminated 2'-O-fucosyllactose by crystallizing 2'-O-fucosyllactose. Arsenic contamination is disposed together with the mother liquor.

Example 3

In example 3, a powderous breastmilk substitute is manufactured by blending inter alia the following compounds:

- 2'-O-fucosyllactose, available at DSM® Nutritional Products, Switzerland
- microencapsulated ARA and DHA from vegetarian source, available at DSM® Nutritional Products, Switzerland (powder)
- corn maltodextrin
- whey protein concentrate
- further optional ingredients (vitamin D, lutein)

2'-O-fucosyllactose as used in example 3 has been produced by microbial fermentation; the last purification step was crystallization. The microencapsulated ARA and DHA is neither from krill oil nor from fish oil. Instead of rice maltodextrin, corn maltodextrin is used.

Analytics show that the powderous breastmilk substitute of example 3 comprises less than 95 parts per billion of arsenic.

Comparative Example 4

In example 4, a powderous breastmilk substitute is manufactured by blending inter alia the following compounds:

- 2'-O-fucosyllactose
- microencapsulated fish oil comprising ARA and DHA (powder)
- rice maltodextrin
- whey protein concentrate
- further optional ingredients (e.g. vitamins, lutein)

2'-O-fucosyllactose as used in example 4 has been produced by microbial fermentation. In the last purification step, activated carbon was used.

Analytics show that the powderous breastmilk substitute of example 4 comprises more than 95 parts per billion of arsenic.

Example 5

In example 5, baby food is prepared by dispersing the powderous breastmilk substitute of example 3 in cold, purified water. The water does not contain any arsenic. Analytics show that the thus obtained baby food is substantially free of arsenic.

The invention claimed is:

1. An infant formula comprising:

a) a fermentation product comprising at least one human milk oligosaccharide (HMO), wherein the at least HMO is at least 0.5 weight-%, based on the total weight of the infant formula, b) an algae oil or fungi oil comprising docosahexaenoic acid or arachidonic acid, c) corn maltodextrin, and d) less than 5 weight-% water, based on the total weight of the infant formula, wherein the infant formula comprises less than 95 parts per billion of arsenic, wherein the fermentation product has been subjected to a final purification step, and wherein the final purification step is crystallization or not activated charcoal treatment.

2. The infant formula according to claim 1, wherein the at least one HMO comprises at least one crystallized HMO.

3. The infant formula according to claim 1, wherein final purification step is not activated charcoal treatment.

4. The infant formula according to claim 1, wherein the at least one HMO is selected from the group consisting of 2'-O-fucosyllactose, lacto-N-neotetraose, lacto-N-tetraose, 3'-sialyllactose, 6'-sialyllactose, 3-O-fucosyllactose, 2', 3-di-O-fucosyllactose, and lacto-N-fucopentaose I; or a mixture thereof.

5. The infant formula according to claim 4, wherein the at least one human milk oligosaccharide is 2'-O-fucosyllactose.

6. The infant formula according to claim 1, further comprising lutein.

7. The infant formula according to claim 1, wherein the the algae oil or fungi oil is a coacervate.

8. A method of manufacturing the infant formula of claim 1, comprising the step of:

(i) producing at least one human milk oligosaccharide (HMO) in a fermentation broth, (ii) isolating the at least one HMO from the fermentation broth to obtain a fermentation product, (iii) blending the fermentation product with microencapsulated algae oil or microencapsulated fungi oil, and corn maltodextrin, wherein the isolation step (ii) comprises a last purification that is a crystallization step or not using activated charcoal.

9. The method according to claim 8, wherein the at least one HMO comprises 2'-O-fucosyllactose.

10. A baby food, obtainable by adding water to the infant formula according to claim 1.

11. The infant formula according to claim 1, wherein the algae oil or fungi oil comprising docosahexaenoic acid or arachidonic acid comprises microencapsulated algae oil, microencapsulated fungi oil, or a mixture thereof.

12. The infant formula according to claim 11, wherein the microencapsulated algae oil, microencapsulated fungi oil, or a mixture thereof is a spray dried powder that comprises docosahexaenoic acid, arachidonic acid, or a mixture of both.

13. The infant formula according to claim 1, wherein the infant formula comprises less than 5 weight-% of carbohydrate originating from rice, based on the total weight of the infant formula.

14. The infant formula according to claim 13, wherein the infant formula comprises rice maltodextrin, provided that the rice maltodextrin comprises less than 5 weight-% of the total weight of the infant formula.

15. An infant formula comprising a) 2'-O-fucosyllactose, b) microencapsulated algae oil, microencapsulated fungi oil, or a mixture thereof, c) corn maltodextrin, d) less than 5 weight-% of rice maltodextrin, based on the total weight of the infant formula, and e) less than 5 weight-% water based on the total weight of the infant formula.

16. The infant formula according to claim 15, wherein the infant formula is a powderous breastmilk substitute comprising less than 90 parts per billion of arsenic.

17. The infant formula according to claim 15, wherein the 2'-O-fucosyllactose comprises at least 0.5 weight-% based on the total weight of the infant formula.

18. The infant formula according to claim 15, wherein the infant formula further comprises lutein.

19. The infant formula according to claim 15, wherein the infant formula further comprises at least one vitamin.

20. The infant formula according to claim 19, wherein the at least one vitamin comprises vitamin D3.

* * * * *